United States Patent
Niebling et al.

(10) Patent No.: US 7,140,781 B2
(45) Date of Patent: Nov. 28, 2006

(54) SEALING UNIT FOR A WHEEL BEARING

(75) Inventors: Peter Niebling, Bad Kissingen (DE);
Jens Heim, Schweinfurt (DE);
Heinrich Hofmann, Schweinfurt (DE);
Darius Dlugai, Schweinfurt (DE);
Roland Langer, Schwanfeld (DE)

(73) Assignee: FAG Kugelfischer AG (DE)

( * ) Notice: Subject to any disclaimer, the term of this patent is extended or adjusted under 35 U.S.C. 154(b) by 169 days.

(21) Appl. No.: 10/923,966

(22) Filed: Aug. 23, 2004

(65) Prior Publication Data

US 2005/0047693 A1 Mar. 3, 2005

(30) Foreign Application Priority Data

Aug. 25, 2003 (DE) ................................ 103 38 957

(51) Int. Cl.
*F16C 32/00* (2006.01)
(52) U.S. Cl. ...................................... 384/448; 384/486
(58) Field of Classification Search ................ 384/448, 384/477, 486; 324/207.25
See application file for complete search history.

(56) References Cited

U.S. PATENT DOCUMENTS

| | | | | | |
|---|---|---|---|---|---|
| 4,968,156 | A | * | 11/1990 | Hajzler | 384/448 |
| 5,873,658 | A | * | 2/1999 | Message et al. | 384/448 |
| 5,969,518 | A | * | 10/1999 | Merklein et al. | 324/207.25 |
| 6,227,710 | B1 | * | 5/2001 | Message et al. | 384/448 |

* cited by examiner

*Primary Examiner*—Thomas R. Hannon
(74) *Attorney, Agent, or Firm*—Ostrolenk, Faber, Gerb & Soffen, LLP

(57) ABSTRACT

A sealing unit for a wheel bearing, including a cover cap of sheet metal on a rotationally fixed bearing ring. An elastic seal on the cover cap. A baffle plate which protrudes in a radial direction, displaced on a bearing ring which can rotate with respect to the rotationally fixed bearing ring. The cover cap has a rotationally symmetrical hollow shoulder which extends axially in the direction of roller bodies of the bearing. The seal is fixed with respect to the shoulder of the cover cap and at the same time the seal bears with at least one sealing lip, at least once in a radially sealing fashion against a hollow cylindrical section which is fixed with respect to the rotatable bearing ring and protrudes axially from the baffle plate in the direction of the bearing roller bodies.

14 Claims, 2 Drawing Sheets

SEALING UNIT FOR A WHEEL BEARING

FIELD OF THE INVENTION

The invention relates to a sealing unit for a wheel bearing. The sealing unit at least has a cover cap made of sheet metal on a rotationally fixed bearing ring, an elastic seal on the cover cap and a radially protruding baffle plate on a bearing ring which baffle plate can rotate with respect to the rotationally fixed bearing ring.

BACKGROUND OF THE INVENTION

The invention can be applied to all known types of a wheel bearing such as, for example, with fixed outer rings and inner rings which can rotate with respect to the outer rings, with fixed inner rings and outer rings which can rotate with respect to the inner rings, with divided inner or outer rings and with inner or outer rings which form one unit together with a flange.

Such a sealing unit protects the interior of the wheel bearing against environmental influences from the outside. The interior of the wheel bearing is understood to be the roller bodies which are arranged radially between the outer ring and the inner ring, cages for guiding the roller bodies and components of sensor devices for a wheel bearing and, if appropriate, further elements of the bearing which are arranged mainly radially between the inner and outer ring. The roller bodies may be balls or conical rollers.

Such a sealing unit is described in DE 196 447 44 C2. This sealing unit has a cover cap made of sheet metal, an elastic seal on the cover cap and a baffle plate. In this case, the cover cap is pressed, with a hollow cylindrical section, into the outer ring of a wheel bearing in a rotationally fixed fashion. The cover cap extends, via an annular disk section, radially from the section in the direction of the inner ring and of the baffle plate. The baffle plate is securely seated on the inner ring and is provided in one piece with a carrier for a pulse transmitter. The pulse transmitter is seated axially behind the cover cap toward the roller bodies of the radial bearing. A seal attached to the cover plate bears with two annular sealing lips against a step in the baffle plate and provides a seal against the moveable inner ring.

SUMMARY OF THE INVENTION

At the time at which the invention was made, the object was to improve a sealing unit of the genus-forming type with respect to its mounting characteristic and to prolonging its service life. Furthermore, the object was to configure the sealing unit in such a way that more installation space is available for parts of a sensor system which are arranged in the interior of the bearing.

This object is achieved by the invention. The sealing unit has at least one cover cap which is formed so as to be mostly rotationally symmetrical and is formed from sheet metal. The cover cap is placed on a rotationally fixed outer or inner and/or divided bearing ring. The sealing unit is also provided with an annular elastic seal and a baffle plate. The seal is attached to the cover cap, preferably by integral injection molding, or is vulcanized onto the cover cap. The seal including a sealing lip is comprised of one material or from a plurality of components made of the same material or of different materials.

The baffle plate is formed in the shape of a circular ring and protrudes radially from a rotatable bearing ring, which is preferably an inner bearing ring or a divided bearing ring, and the baffle plate is attached to the bearing ring by a form fit.

The cover cap at least axially adjoins, with a preferably disk-shaped section, the roller bodies of the roller bearing which roller bodies are arranged radially between the bearing rings. The cover cap thus covers the interior of the bearing from the outside, at least in the axial direction. A rotationally symmetrical, hollow shoulder is provided on the cover cap. The shoulder extends from the disk-shaped section of the cap axially inward in the direction of the roller bearings and is preferably hollow cylindrical. The seal which is fixed with respect to the shoulder is provided with at least one sealing lip. The sealing lip bears at least once in a radially sealing fashion against a hollow cylindrical section which is fixed with respect to the rotatable bearing ring and protrudes axially from the baffle plate in the direction of the roller bodies. The hollow cylindrical section is constructed in one piece with the baffle plate. The baffle plate adjoins the sealing lip axially on the outside on one side of the sealing facing away from the roller bodies.

Considered in the longitudinal section of the sealing unit, which is parallel with the central axis of the wheel bearing, the annular seal firstly adjoins the shoulder in the axial direction of the roller bodies, with at least one third of the axial extent of the shoulder. The free axial length of the seal protrudes axially from the shoulder thus corresponds at least to one third of the length with which the shoulder protrudes axially from the cover cap. In this arrangement, the seal is freely elastically moveable in a radial direction, starting from its connection (attachment) to the shoulder and extending to its free end. This means that the annular seal can, for example, be elastically constricted or widened in this region without being supported radially on the shoulder or without being impeded thereby in the process. This is advantageous in particular when the seal is mounted. Since the sealing lip is generally mounted with prestress on the inner ring, and therefore easily widened elastically during the mounting on the inner ring, the sealing lip can freely expand radially outwards. The prestress is generally 0.2 mm in practice.

Furthermore, at least the part of the seal which protrudes freely from the shoulder is radially thicker than the thickness of the sheet metal from which the cover cap and thus the shoulder are formed. As it extends further, the seal is continuous with at least one sealing lip which bears in a sealing fashion against the hollow cylindrical section of the baffle plate. In the process, the wall thickness of the sealing lip, viewed in the longitudinal section, is smaller than the axial extent, viewed in this longitudinal section, of the seal which protrudes freely from the shoulder.

A sealing unit with a seal which is configured as described above can be easily mounted since more radial free space for expansion during the mounting of the sealing lip onto the shoulder of the baffle plate is available to the seal and to the sealing lip. Furthermore, as the seal is of overall significantly more elastic construction, a longer service life of the sealing unit can be expected.

One configuration of the invention provides for the sealing lip to bear twice in a sealing fashion against the baffle plate, one free end of the sealing lip bearing in a sealing fashion directly against the annular baffle plate in the axial direction. Such a seal is also configured with a spring which engages around the sealing lip in an annular shape and which prestresses the lip radially against a section of the baffle plate or at least the part of the sealing lip which bears radially against baffle plate section.

A further configuration of the invention provides for a presealing lip which is arranged axially in front of the side of the sealing lip facing away from the roller bodies. The presealing lip is preferably arranged radially between the shoulder of the cover cap and the section on the baffle plate and lies either radially in a sealing fashion against the baffle plate section or axially in a sealing fashion against the baffle plate.

The sealing unit is preferably arranged in a wheel bearing in which the cover cap is fixed with respect to an outer ring of the bearing and the baffle plate is fixed with respect to an inner ring thereof.

Further configurations of the sealing unit relate to a wheel bearing with at least one pulse transmitter of a sensor system of the wheel bearing. The cover cap is formed here from a non-ferromagnetic metal sheet and covers, at least axially, the pulse transmitter arranged axially between the cover cap and the roller bodies protecting it against influences from the outside. The shoulder on the cap is arranged at least partially concentrically between the pulse transmitter and the section on the baffle plate.

In this last-mentioned arrangement, the seal is arranged at least partially concentrically with respect to a hollow cylindrical segment of a securing plate which secures the pulse transmitter to the rotatable bearing ring. The securing plate for the pulse transmitter is formed either separately from the baffle plate on the inner ring, preferably by means of a form fit, or, as in one configuration of the invention, in one piece with the section and thus in one piece with the baffle plate. For this purpose, the hollow cylindrical segment is continuous, on its side facing the roller bodies, with the securing plate which secures the pulse transmitter. The securing plate and the baffle plate are preferably aligned in parallel with one another and hold the sealing lip axially between them.

The invention provides for a sealing unit for a wheel bearing with at least one pulse transmitter of a sensor system of the wheel bearing and having the following features:

the cover plate is manufactured from a non-ferromagnetic sheet metal by cold forming such as deep drawing, pressing, stamping or combinations of these methods, the cover plate covers, at least axially on the outside, the pulse transmitter which is arranged axially between the cover cap and between the roller bodies, the cover cap is attached to a rotationally fixed, outer bearing ring, preferably by means of a form fit, an elastic seal of any desired embodiment, but preferably embodied according to the invention, is attached to the cover cap, and a radially protruding baffle plate is fixed with respect to an inner bearing ring which can rotate with respect to the rotationally fixed bearing ring, the cover cap surrounds, radially on the outside and preferably with a section which is formed so as to be hollow cylindrical, the pulse transmitter which dips in radially between the bottom part of the cover cap and the outer bearing ring, and the cover cap is at the same time securely sealed radially on the outside on the outer bearing ring, preferably with the hollow cylindrical section.

As a result of the engagement over the outer ring and as a result of the end-face distance between the preferably disk-shaped section of the cover cap and the end face of the outer ring, additional space for the pulse transmitter is provided axially between the cover cap and the end face of the outer ring. The pulse transmitter can thus be configured in a more generous way in its radial dimensions and projects radially into the additional free space provided by means of the axial distance between the cover cap and the outer ring with the invention.

Further configurations of the invention provide for the cover cap to have the rotationally symmetrical hollow shoulder extending axially in the direction of the roller bodies. The shoulder is preferably of as short a construction as possible in its free axial length and holds the seal with at least one sealing lip. In this configuration, according to the invention the seal is preferably freely moveable in a radially outward direction in an elastic fashion starting from its connection to the shoulder, and the seal bears against the hollow cylindrical section which protrudes axially from the baffle plate in the direction of the roller bodies.

The pulse transmitter is either a baffle element or a magnet which is arranged on a baffle carrier and has alternating polarization. The pulse transmitter made of sheet metal and the carrier therefor are constructed in one piece with the baffle plate and are connected to one another here by the hollow cylindrical section.

A further configuration of the invention provides for the hollow cylindrical section to have an annular groove toward the baffle plate, which is bent from the section. The annular groove adjoins the section at the transition to the baffle plate which is formed in a circular ring shape and protrudes radially. The baffle plate has here a sheet metal thickness which is reduced at least by the radial depth of the annular groove. Before the sealing lip is mounted on the section of the baffle plate, the baffle plate is present, together with the section, in a hollow cylindrical form. Here, the external diameter of the material for the baffle plate on the hollow cylinder is reduced by twice the depth of the annular groove in comparison with the external diameter of the section. After the seal has been fitted onto the cylindrical section, the baffle plate is manufactured by widening and radially fitting on the cylindrical section which is reduced in diameter. The transition from the relatively small to the relatively large diameter is a predetermined bending point here which secures the axial position of the finished baffle plate, for example, to the securing plate for the pulse transmitter and facilitates the radial bending of the baffle plate.

Finally, one configuration of the invention provides for the axial shoulder on the cover plate to be arranged at least partially concentrically between the pulse transmitter and the section. The pulse transmitter is secured to the inner bearing ring by a securing plate. In this arrangement, the seal is arranged at least partially concentrically within a hollow cylindrical segment of the securing plate. Considered in the longitudinal section of the bearing, the hollow cylindrical segment extends here away from the securing plate which preferably firstly protrudes in the direction of the cover cap, away from the securing plate which firstly preferably protrudes radially in a disk shape and is of conical or hollow cylindrical construction. Afterwards, the securing plate is preferably again directed radially outwards in the form of a circular ring. The pulse transmitter is for the most part attached or constructed on the previously mentioned section of the securing plate which is in the shape of a circular ring.

Other features and advantages of the present invention will become apparent from the following description of the invention which refers to the accompanying drawings.

BRIEF DESCRIPTION OF THE DRAWINGS

The invention is explained in more detail below with reference to exemplary embodiments, in which.

DETAILED DESCRIPTION OF THE INVENTION

Figure 1:
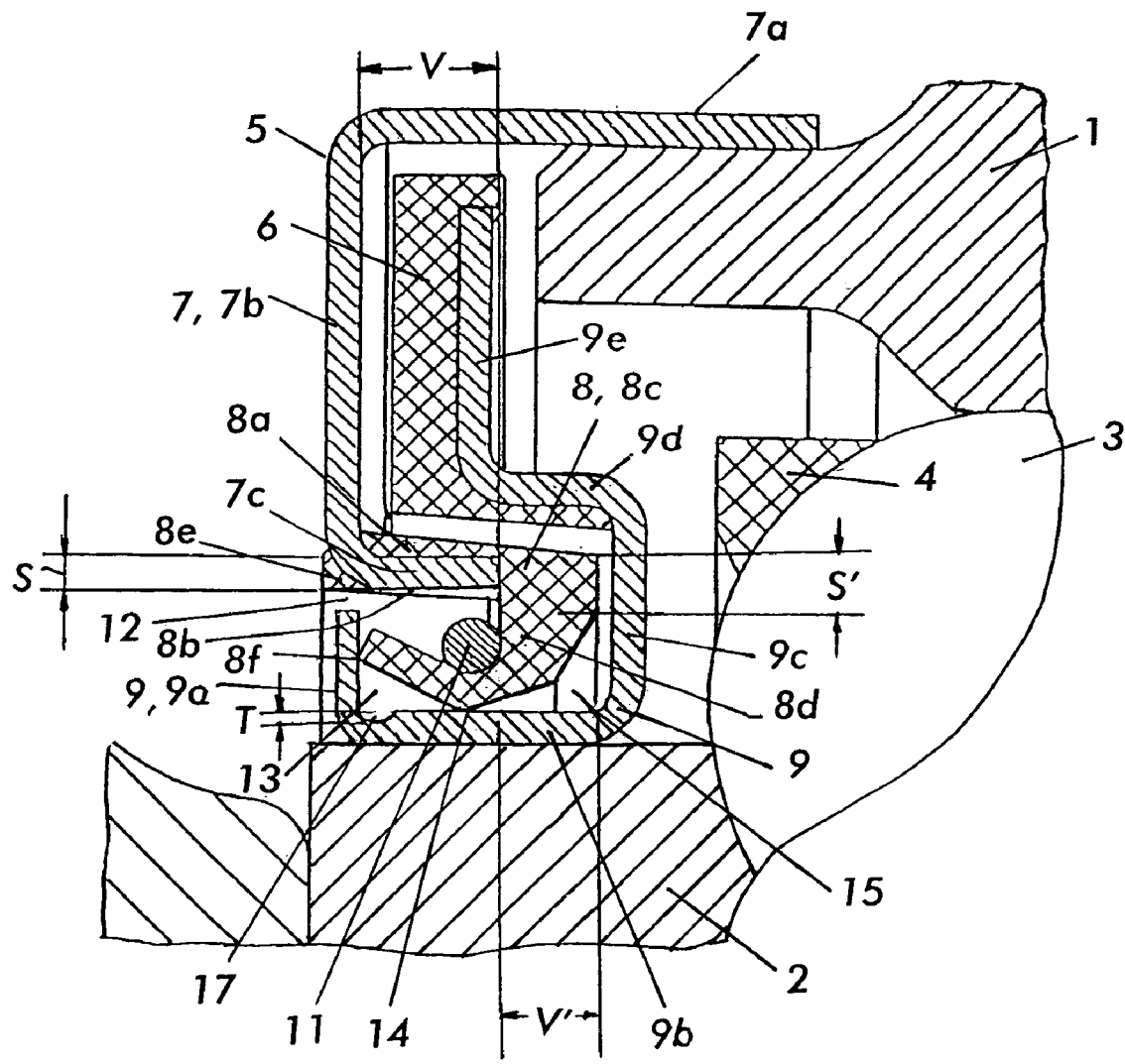
FIG. 1 shows a longitudinal section through a sealing unit according to the invention, in which the seal has a double-sealing sealing lip which is prestressed with an endless spiral spring.
Figure 2:
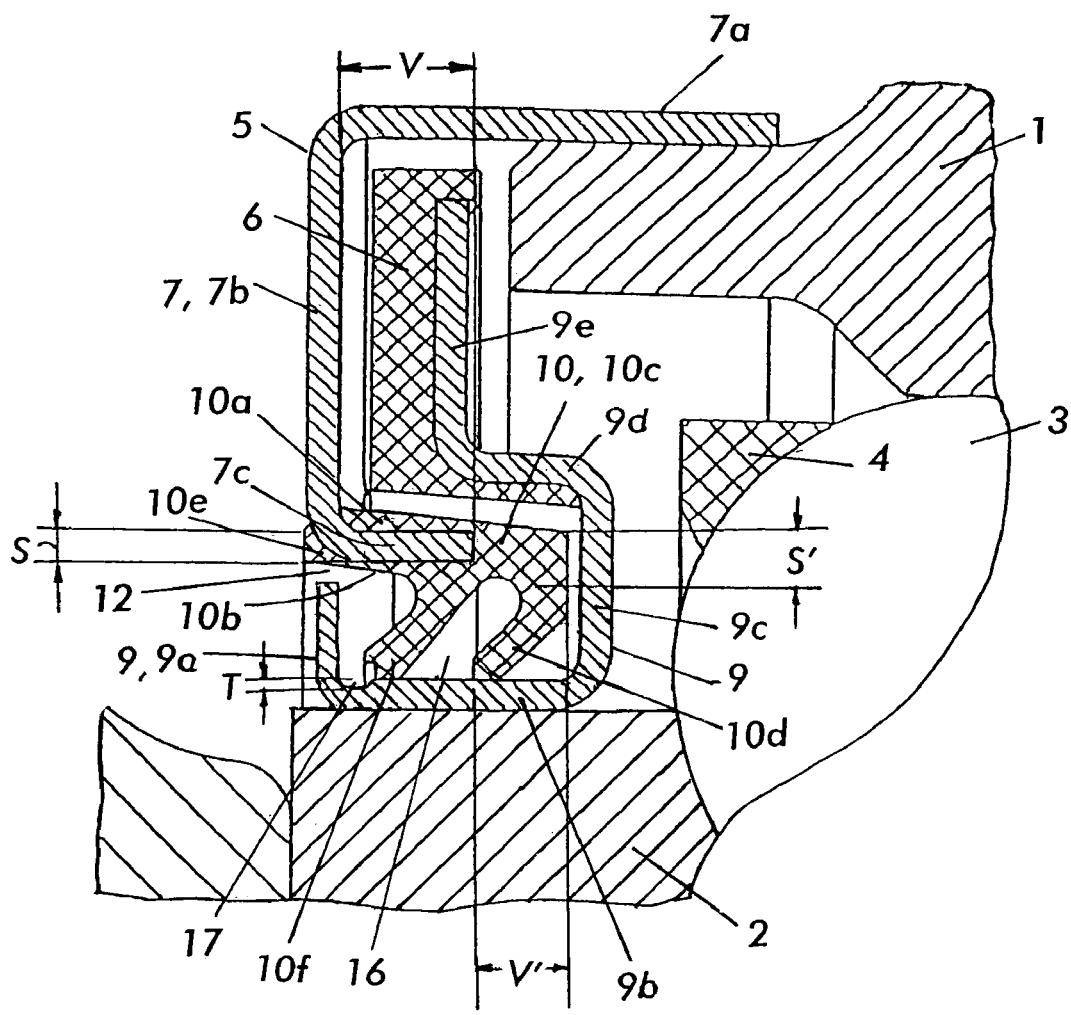
FIG. 2 shows an exemplary embodiment of the invention which has a seal with two sealing lips.

FIGS. 1 and 2 show a partial view of a wheel bearing, in a section plane which extends in the direction along the center axis (not illustrated) of the wheel bearing. The wheel bearing has at least one rotationally fixed bearing ring 1 in the form of an outer ring, a bearing ring 2 which can rotate with respect to the outer ring and is in the form of an inner ring, roller bodies in the form of balls 3, a cage 4 and a sealing unit 5. A pulse transmitter 6 is arranged in the wheel bearing. The sealing unit 5 is comprised of a cover cap 7, an elastic seal 8, 10 and of a baffle plate 9.

The cover cap 7 is of rotationally symmetrical construction in the form of a cup and has radially on the outside a hollow cylindrical section 7a, in addition a disk-shaped bottom part 7b, which is preferably constructed in the form of a circular ring or of a disk, and a hollow cylindrical shoulder 7c. With the section 7a, the cover plate 7 is seated securely on an outer circumference of the rotationally fixed bearing ring 1. The section 7a of the cover plate 7 covers the interior of the bearing and in particular the pulse transmitter 6, shutting it off radially from the outside.

The bottom part 7b extends radially from the section 7a in the direction of the rotatable bearing ring 2 and in doing so, the part 7b covers the interior of the wheel bearing and the pulse transmitter 6 axially. The center of the bottom part 7b is made to extend axially in the direction of the roller bodies 3 so that the shoulder 7c extends from the bottom 7b. The seal 8, according to the illustration in FIG. 1, is attached to the shoulder 7c and the seal 10, according to the illustration in FIG. 2, is attached to the shoulder 7c.

The seal 8 also has connections to the shoulder 7c which are designated as the floating membranes 8a and 8b, a base 8c, a sealing lip 8d, a bead 8e and a spring 11. The seal 8 is connected via the floating membranes 8a and 8b to the cover cap 7, and is in particular connected radially to the shoulder 7c. The annular seal 8 firstly adjoins, with the base 8c, the shoulder 7c in the axial direction. In this configuration, the base 8c which is connected at the end to the shoulder 7c protrudes free of the shoulder 7c in the direction of the roller bodies 3 from the shoulder 7c. As it extends further, the seal 8 is continuous, at the base 8c, with the sealing lip 8d which forms a double seal. The bead 8e protrudes from the floating membrane 8b and is formed axially on the outside of the cover cap 7 and radially over the baffle plate 9.

In FIG. 2, the seal 10 has floating membranes 10a and 10b, a base 10c, a sealing lip 10d, a bead 10e and a presealing lip 10f. The floating membranes 10a and 10b, the bead 10e and the base 10c are assigned and connected to the shoulder 7c in a way which is analogous to the sealing lip 8. In contrast with the seal 8, the single-sealing sealing lip 10d firstly protrudes from the seal 10. The presealing lip 10f, which is continuous with the floating membrane 10b, and which is connected radially to the shoulder 7c, then follows on one side of the sealing lip 10d facing away from the roller bodies 3.

The seal 8, 10 protrudes freely from the shoulder 7c at the base 8c, 10c by the axial extent V'. The axial extent V' is at least as large as, or larger than, a third of the axial extent V of the shoulder 7c in the bottom part 7b in the direction of the roller bodies 3. The seal 8, 10 is radially thicker at the base 8c, 10c in the region indicated by S' than the sheet thickness of the metal sheet of the cover cap 7 on the shoulder 7c which is marked by S.

The baffle plate 9 is per se a disk-shaped circular ring section 9a which protrudes radially from the rotatable bearing ring 2, but which is shaped as a sheet metal part in one piece with a hollow cylindrical section 9b and a securing plate 9c. The wall thickness of the circular ring section 9a is reduced by an amount T in comparison with the wall thickness of the section 9b so that ultimately, the actual baffle plate 9 on the circular ring section 9a has a smaller sheet metal thickness than the section 9b. T corresponds here to the depth of the annular groove 17 which has been produced at the predetermined bending point, after the section 9b. After the seal 8, 10 has been fitted onto the section 9b, while the seal unit 5 is being mounted the hollow cylindrical section with the smaller wall thickness is widened to form the circular ring section 9a and moved radially outwards.

The sealing lips 8d, 10d and 10f are arranged axially between the circular ring section 9a and the securing plate 9c, the securing plate 9c firstly extending radially outward away from the rotatable bearing ring 2 in a disk shape and then being continuous with a hollow cylindrical segment 9d which at least partially engages around the seal 8, 10. The securing plate 9c finally continues in a circular ring section 9e which is directed radially outwards and to which the pulse transmitter 6 is attached.

The pulse transmitters 6 which are shown in FIGS. 1 and 2 are magnetized pulse transmitters with alternating polarization in a plastic carrier mass. It is also conceivable for the pulse transmitter to be formed, for example, by means of the carrier made of sheet metal itself with corresponding marks such as holes and webs between the holes or stamped parts of the sheet metal.

The sealing unit 5 protects the interior of the wheel bearing and the pulse transmitter 6 against external environmental influences such as moisture, dust and mechanical effects from the outside. The wheel bearing is essentially protected here by the cover cap 5 and the circular ring section 9a of the baffle plate 9.

The rotatable joint in the sealing unit 5 is sealed by means of the seals 8 and 10. The baffle plate 9 essentially protects the seal 8, 10 from the outside against coarse environmental influences such as dust or mechanical effects. The radial air gap 12 between the free external circumference of the circular ring section 9a and the cover cap is to be kept as small as possible here. The size of the air gap is also regulated by the bead 8e, 10e. Dirt and water which impinge on the circular ring section 9a are mainly kept away from the sealing lips 8d, 10f owing to the small air gap, and at the rotating baffle plate 9 they are conducted radially outwards away from the sealing unit 5. Dirt which penetrates via the air gap 12 is held back at the seal 8, firstly by the free end 8f of the sealing lip 8d which acts as a preseal. Water or dirt which has liquefied with water runs out of the air gap 12 again, and when the inner ring is rotating, it is thrown out through the air gap 12 by means of the baffle plate.

The annular cavity 13 which is bounded by the sealing lip 8d and the baffle plate 9 is optionally filled with grease. The cavity 13 is joined on the roller body side by a radial contact 14 between the sealing lip 8d and the section 9b. The sealing lip 8d is prestressed radially in the direction of the rotatable bearing ring 2 by the spring 11, which is constructed as a spring ring, endless spiral spring or the like. The half-open cavity 15 which adjoins the sealing lip 8d on the roller body side of the contact 14 is optionally also filled with grease.

The presealing lip 10f on the seal 10 performs presealing. The presealing lip 10f is adjoined on the roller body side by an annular cavity 16 which is optionally filled with grease and which is bounded on the roller body side by the sealing lip 10d.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A sealing unit for a wheel bearing, the sealing unit comprising:
    a cover cap made of sheet metal and attachable on a rotationally fixed bearing ring, the cover cap having a rotationally symmetrical shoulder which extends in the direction of roller bodies of the bearing, and the shoulder defines a hollow space,
    a baffle plate extending in a radial direction and disposed on a rotatable bearing ring which can rotate with respect to the rotationally fixed bearing ring,
    a hollow cylindrical section which is fixed with respect to the rotatable bearing ring and the cylindrical section protrudes axially from the baffle plate in the direction of the roller bodies of the bearing,
    an elastic annular seal on the cover cap, the elastic seal being fixed with respect to the shoulder, the seal having at least one sealing lip which bears at least once in a radially sealing fashion against the hollow cylindrical section,
    the annular seal protruding in an axial direction from the shoulder and in an annular shape and the seal projecting free of the shoulder and in the direction of the roller bodies of the bearing, wherein the seal projects from the shoulder by at least one third of the axial length of the shoulder; the seal along with the shoulder projecting freely from the cover cap in the axial direction, the seal being radially thicker than the thickness of the sheet metal of the cover cap, and starting from the shoulder, the freely projecting seal can be freely elastically varied in a radial direction by the shoulder, and
    the seal is continuous, as it extends further, and the seal includes at least one sealing lip which bears in a sealing fashion against a section of the baffle plate.

2. The sealing unit as claimed in claim 1, wherein the section of the baffle plate comprises the hollow cylindrical section thereof.

3. The sealing unit as claimed in claim 1, wherein the sealing lip bears at two locations in a sealing fashion against the baffle plate, including the sealing lip having a free end which bears against the baffle plate in a sealing fashion in an axial direction.

4. The sealing unit as claimed in claim 1, further comprising a spring which engages annularly around the sealing lip and prestresses the sealing lip in a radial direction against the section of the baffle plate.

5. The sealing unit as claimed in claim 1, further comprising a presealing lip arranged radially between the shoulder and the section of the baffle plate.

6. The sealing unit as claimed in claim 1, wherein the cover cap is fixed with respect to an outer ring of the wheel bearing, and the baffle plate is fixed with respect to an inner ring of the wheel bearing.

7. The sealing unit as claimed in claim 6, wherein the cover cap is non-rotatable along with the outer ring of the wheel bearing and the baffle plate is rotatable along with the inner ring of the bearing.

8. A sealing unit as claimed in claim 1, wherein
    the wheel bearing has at least one pulse transmitter arranged axially between the cover cap and the roller bodies of the wheel bearing,
    a securing plate with a hollow cylindrical segment which holds the pulse transmitter on the rotatable bearing ring,
    the cover cap is comprised of a non-ferromagnetic sheet metal and is shaped and located to cover the at least one pulse transmitter at least in the axial direction,
    the shoulder is arranged at least partially concentrically between the pulse transmitter and the section of the baffle plate, and the seal is arranged at least partially concentrically with respect to the hollow cylindrical segment of the securing plate.

9. A sealing unit as claimed in claim 1, wherein
    the wheel bearing has at least one pulse transmitter arranged axially between the cover cap and the roller bodies of the wheel bearing,
    the cover cap is comprised of a non-ferromagnetic sheet metal is shaped and located to cover the at least one pulse transmitter at least in the axial direction,
    the section of the baffle plate includes a side that is continuous facing the roller bodies of the bearing, the baffle plate having at least one circular ring section;
    a securing plate which secures the pulse transmitter; the securing plate and the at least one circular ring section of the baffle plate holding the sealing lip axially between them.

10. A sealing unit for a wheel bearing, wherein the wheel bearing has a rotatable inner bearing ring, a rotationally fixed outer bearing ring, and roller bodies between the rings, and at least one pulse transmitter; the sealing unit comprising
    a cover cap comprised of a non-ferromagnetic sheet metal, the cover cap having a bottom part, the bottom part extending radially to cover the at least one pulse transmitter at least in the axial direction, the pulse transmitter is arranged axially between the cover cap and the roller bodies of the bearing,
    the cover cap is fixed with respect to the rotationally fixed outer bearing ring,
    an elastic seal fixed with respect to the cover cap and
    a radially protruding baffle plate fixed with respect to the inner bearing ring, the inner bearing ring is rotatable with respect to the outer bearing ring,
    the cover cap surrounding and being axially on the outside of the pulse transmitter, the cover cap extending radially between a radially inward part of the cover cap and the outer bearing ring, and the cover cap being securely seated radially on the outside on the outer bearing ring and including a rotationally symmetrical hollow shoulder which extends axially in the direction of the roller bodies of the bearing.

11. The sealing unit as claimed in claim 10, wherein
    the baffle plate is fixed with respect to the outer bearing ring the baffle plate and has a hollow cylindrical section which protrudes axially from the baffle plate axial in the axial direction to the roller bodies; and
    the seal is fixed with respect to the shoulder of the cover cap, the seal includes at least one sealing lip and the at least one lip bears at least once in a radially sealing manner against the hollow cylindrical section on the baffle plate.

12. The sealing unit as claimed in claim 11, wherein the baffle plate has a continuous section, on its side facing the roller bodies and the continuous section includes a securing plate which secures the pulse transmitter, the securing plate and the baffle plate holding the sealing lip axially between them.

13. The sealing unit as claimed in claim 12, wherein the baffle plate cylindrical section has an annular groove therein which opens toward a circular ring section that is bent in the radial direction from the cylindrical section of the baffle plate, and the circular ring section has an axial wall thickness which is reduced at least by the radial depth of the annular groove compared with the wall thickness of the cylindrical section of the baffle plate.

14. The sealing unit as claimed in claim 11, wherein the cover cap is arranged at least partially concentrically between the pulse transmitter and the radially inward section of the cover cap, a securing plate with a hollow cylindrical segment which secures the pulse transmitter;

the seal is arranged on the inner bearing ring, at least partially concentrically with respect to the hollow cylindrical segment of the securing plate which secures the pulse transmitter.

* * * * *